United States Patent [19]

Ng et al.

[11] Patent Number: 4,959,267

[45] Date of Patent: Sep. 25, 1990

[54] FIBER REINFORCED RUBBER PRODUCTS

[75] Inventors: Howard C. H. Ng, Kingston; Frederick J. Hunter, Oakville, both of Canada

[73] Assignee: Du Pont Canada Inc., Mississauga, Canada

[21] Appl. No.: 276,077

[22] Filed: Nov. 23, 1988

[51] Int. Cl.$^5$ ............... B32B 9/00; B32B 15/00; B32B 23/00; D02G 3/00

[52] U.S. Cl. ............... 428/390; 152/565; 427/208.8; 428/288; 428/378; 428/395; 525/138; 525/139

[58] Field of Search ............ 152/565; 427/208.8; 8/115.6, 288; 428/378, 390, 394, 395; 525/138, 139

[56] References Cited

U.S. PATENT DOCUMENTS

| | | | |
|---|---|---|---|
| 3,628,906 | 12/1971 | Dithmar et al. | 8/111 |
| 3,687,721 | 8/1972 | Dardoufas | 117/138.8 |
| 4,263,082 | 4/1981 | Temple | 156/309.3 |
| 4,325,857 | 4/1982 | Champaneria | 523/412 |
| 4,460,718 | 7/1984 | Tanaka et al. | 523/400 |
| 4,623,011 | 11/1986 | Kanuma | 152/565 X |
| 4,675,347 | 6/1987 | Mochizuki et al. | 106/16 X |
| 4,764,562 | 8/1988 | Tojo et al. | 525/331.7 X |
| 4,824,580 | 4/1989 | Standridge et al. | 210/708 |

FOREIGN PATENT DOCUMENTS

1025376 3/1958 Fed. Rep. of Germany .
2187902 1/1974 France .

OTHER PUBLICATIONS

Chem. Abstracts, vol. 100(2), 15374g (1984).
Chem. Abstracts, vol. 96(20), 164305m (1982).
Chem. Abstracts, vol. 87(10), 69185c (1977).
Chem. Abstracts, vol. 103(10), 72549d (1985).
Chem. Abstracts, vol. 66, 105803e (1967).

*Primary Examiner*—Michael Lusignan

[57] ABSTRACT

A reinforcing fiber is provided for use in fiber-reinforced rubber products. The reinforcing fiber has a first coating layer of a cured guanide compound over which is a second layer of an adhesive for bonding the fiber to rubber, the adhesive usually being a cured resorcinol formaldehyde latex composition. The coated fiber is embedded in uncured rubber which is then cured to create a fiber-reinforced rubber product.

11 Claims, No Drawings

FIBER REINFORCED RUBBER PRODUCTS

BACKGROUND OF THE INVENTION

The present invention relates to fiber-reinforced rubber products, fiber reinforcements for such products and processes for manufacturing such reinforcements.

Molded rubber products such as tires and hoses often contain polyamide fiber reinforcement. The fiber, usually in the form of a cord, is typically prepared by coating the cord with an adhesive, such as resorcinol formaldehyde latex (RFL) composition. The coated cord may be subsequently heat-treated to cure the adhesive. The resultant coating provides adhesion of the cord to the rubber. The cord is subsequently combined with uncured rubber and the rubber is steam cured.

It has been found that the cord loses significant strength when it is coated with an adhesive and then heat-treated. An object of the present invention is to reduce the amount of strength loss in the fiber intended for reinforcement of rubber after coating with adhesive.

SUMMARY OF THE INVENTION

The present invention provides a reinforcing material for use in manufacturing fiber-reinforced rubber products comprising thermoplastic fiber coated with a first layer of a cured guanide compound and a second layer of adhesive for bonding the fiber to rubber.

The present invention also provides a fiber-reinforced rubber product which includes rubber and a reinforcing material, the reinforcing material comprising thermoplastic fiber coated with a first layer of a cured guanide compound and a second layer of adhesive for bonding the fiber to rubber.

The present invention further provides a process for manufacturing a fiber-reinforced rubber article comprising the steps of:
 coating thermoplastic fiber with a first layer comprising a guanide compound;
 curing said first layer; and
 coating said fiber with a second layer comprising a curable adhesive, preferably a resorcinol/formaldehyde latex.

DETAILED DESCRIPTION OF THE PREFERRED EMBODIMENTS

The fiber of the present invention may be any thermoplastic fiber suitable for reinforcing rubber products, but is preferably polyamide fiber.

Copending application, U.S. Ser. No. 07/208,517, filed June 20, 1988, now abandoned and a continuation-in-part application U.S. Ser. No. 07/250,102 filed Sept. 28, 1988, the contents of the entire disclosures of which are hereby incorporated herein by reference, describe guanide coating compositions that are suitable for use as the first layer of the coated fiber of the present invention.

The guanide compound of the first layer is preferably a biguanide selected from
 1-phenylbiguanide, 1-(2-tolyl)biguanide,
 1,5-diphenylbiguanide, 1-(n-hexyl)biguanide,
 1,5-(n-hexyl)biguanide, 1-(cyclohexyl)biguanide,
 1,5-(cyclohexyl)biguanide and salts thereof.

Usually the first coating amounts to at least 1 percent of the weight of the fiber being coated, preferably in the range of 1 to 3%.

The adhesive layer may be any adhesive suitable for bonding thermoplastic fiber reinforcing material to rubber, but is preferably a resorcinol formaldehyde latex adhesive (RFL) composition. Such compositions are commercially available and widely used in the rubber industry. The amount of RFL coating used in the present invention is the same as that conventionally used in the rubber industry. Generally the RFL coating is about 3 to 5% of the weight of the fiber.

The preferred method of preparing the fiber reinforced rubber product is as follows. The fiber is pre-stretched prior to coating it with the first and second layers to orient the fibers and reduce stretching of the fiber after it has been incorporated into a rubber product. The fiber is then coated with a solution of guanide compound by either spraying or dipping. Spraying is preferred because it is readily adaptable to conventional spinning equipment. The solution is sprayed onto the article downstream from the spinning head after the point at which the polymer has solidified.

The solvent used to make the guanide compound solution is preferably water, ethanol, methanol or mixtures thereof. The particularly preferred solvent contains from 50 to 70% by weight water and 30 to 50% by weight ethanol. The aqueous solution is preferably prepared and maintained at a temperature of no higher than about 65° C. and is most preferably prepared and maintained at a temperature in the range of 55° to 65° C. The solution may include conventional sizing components, such as lubricants, surfactants, antistats, emulsifiers and dispersing agents.

The guanide compound can be cured on the article by exposure to a temperature of about 50° to 120° C., preferably 80° to 120° C., most preferably 100° to 120° C., for a period of about 2 to 30 minutes, preferably about 3 to 10 minutes.

The RFL coating can be applied to the guanide-coated fiber by conventional method. Generally, the RFL coating is applied by dipping the fiber in a guanide solution. The coated fibers then pass through squeeze rolls and a drier to remove excess liquid. The RFL coating usually is cured at a temperature in the range of 150° to 200° C.

The present invention is illustrated by the following example.

EXAMPLE

A bundle of nylon 6,6 fiber of 6 denier per filament were submersed in an aqueous solution in a tank equipped with a series of guide rollers which advance the fiber bundle through and out of the tank. The aqueous solution, which contained 1.0 wt. % of 1-(2-tolyl)-biguanide was maintained at a temperature of 55° C. The solution was agitated by circulating the solution through heated lines between the tank and a reservoir tank. The fiber bundle was submersed in the tank for one hour. The coated fiber bundle was cured in an air oven at 110° C. for 3 minutes and was subsequently cooled to room temperature. The amount of coating on the fiber bundle was 1.5% of the weight of the uncoated fiber bundle.

The guanide coated fiber bundle was then dipped in a bath containing a 10 wt. % latex solution of a resorcinol/formaldehyde mixture (RFL). The fiber bundle was then cured at 150° C. for 1 minute and at 190° C. for another minute. The resultant double-coated fiber bundle was embedded in uncured rubber and then the rubber with the embedded fiber bundle was cured in a mold at 165° C. for seven minutes to form a rubber hose. An identical rubber hose containing a control fiber bundle was made by the same procedure, except that the control bundle did not have a first coating layer off a guanide compound.

The double-coated fiber bundle and the control fiber bundle were separated from the rubber portion of the hoses and individual fiber strands of each bundle were elongated manually. The strands were rated "good" if they had relatively high degree of mechanical strength, "marginal" if they had a low degree of mechanical strength, or "bad" if they were brittle. The strands were then chemically analyzed to determine the amount of guanide coating on the strands. Table 1 summarizes the results of the elongation test and the coating analysis. The results show that mechanical strength of the strands was directly proportional to the amount of guanide coating on the strands.

TABLE 1

Mechanical Strength and Biguanide Coating of Fiber Strands after Rubber Curing

| Sample | Residual Biguanide Coating (Wt. 7) | Strength Rating |
|---|---|---|
| Control | 0 | Bad |
| 1 | 0.78 | Marginal |
| 2 | 1.1 | Good |

We claim:

1. A reinforcinq material for use in manufacturing fiber reinforced rubber products comprising a thermoplastic fiber coated with a first layer of a cured guanide compound and coated thereover a second layer of adhesive for bonding the fiber to rubber.

2. The material of claim 1 wherein said fiber is a polyamide.

3. The material of claim 1 wherein said guanide compound is selected from 1-phenylbiguanide, 1-(2-tolyl)-biguanide, 1,5-diphenylbiguanide, 1-(n-hexyl)biguanide, 1,5-(n-hexyl)biguanide, 1-(cyclohexyl)biguanide, 1,5-(cyclohexyl)biguanide and salts thereof, and amounts to at least 1% by weight of the fiber.

4. The material of claim 1 wherein said guanide compound is 1-(2-tolyl)biguanide.

5. The material of claim 1 wherein said adhesive is a resorcinol formaldehyde latex composition, and amounts to about 3 to 5% by weight of the fiber.

6. A fiber-reinforced rubber product comprising rubber with the reinforcing material of claim 1 embedded therein.

7. A process for manufacturing a fiber for use in manufacturing a fiber-reinforced rubber article, said process comprising the steps of:
   coating a fiber with a first layer comprising a guanide compound;
   curing said first layer;
   coating said fiber with a second layer atop the first layer to obtain a double-coated layer, said second layer comprising an adhesive forbonding the fiber to rubber;
   incorporating said double-coated fiber in uncured rubber; and
   curing said rubber to the double-coated fiber to obtain a fiber-reinforced rubber article.

8. The process of claim 7 wherein said fiber is a polyamide.

9. The process of claim 7 wherein said guanide compound is selected from 1-phenylbiguanide, 1-(2-tolyl)-biguanide, 1,5-diphenylbiguanide, 1-(n-hexyl)biguanide, 1,5-(n-hexyl)biguanide, 1-(cyclohexyl)biguanide, 1,5-(cyclohexyl)biguanide and salts thereof.

10. The process of claim 7 wherein said guanide compount is 1-(2-tolyl)biguanide.

11. The process of claim 7, 8, 9 or 10 wherein said adhesive is a resorcinol formaldehyde latex composition and said process further comprises the step of curing said second layer.

* * * * *